United States Patent
Salkintzis et al.

(10) Patent No.: US 11,218,949 B2
(45) Date of Patent: Jan. 4, 2022

(54) ACCESSING A LOCAL DATA NETWORK VIA A MOBILE DATA CONNECTION

(71) Applicant: Motorola Mobility LLC, Chicago, IL (US)

(72) Inventors: Apostolis Salkintzis, Athens (GR); Dimitrios Karampatsis, Ruislip (GB)

(73) Assignee: Motorola Mobility LLC, Chicago, IL (US)

( * ) Notice: Subject to any disclaimer, the term of this patent is extended or adjusted under 35 U.S.C. 154(b) by 37 days.

(21) Appl. No.: 16/496,385

(22) PCT Filed: Mar. 20, 2017

(86) PCT No.: PCT/EP2017/056543
§ 371 (c)(1),
(2) Date: Sep. 20, 2019

(87) PCT Pub. No.: WO2018/171859
PCT Pub. Date: Sep. 27, 2018

(65) Prior Publication Data
US 2020/0022069 A1    Jan. 16, 2020

(51) Int. Cl.
*H04W 48/12* (2009.01)
*H04W 36/14* (2009.01)
(Continued)

(52) U.S. Cl.
CPC ........... *H04W 48/12* (2013.01); *H04W 36/14* (2013.01); *H04W 48/04* (2013.01); *H04W 48/14* (2013.01);
(Continued)

(58) Field of Classification Search
CPC ..... H04W 48/12; H04W 36/14; H04W 48/04; H04W 48/14; H04W 48/18; H04W 88/06; H04W 84/10; H04L 47/20
See application file for complete search history.

(56) References Cited

U.S. PATENT DOCUMENTS 10,284,659 B2 *  5/2019  Cheshire ............. H04L 61/1541
10,541,926 B2 *  1/2020  Singh ................. H04L 61/2084
(Continued)

FOREIGN PATENT DOCUMENTS

WO    2010/039085 A1    4/2010
WO    2014/107358 A1    7/2014

OTHER PUBLICATIONS

PCT/EP2017/056543, "Notification of Transmittal of the International Search Report and the Written Opinion of the International Searching Authority, or the Declaration", PCT International Searching Authority, dated Dec. 11, 2017, pp. 1-12.

*Primary Examiner* — Brian T O'Connor
(74) *Attorney, Agent, or Firm* — Kunzler Bean & Adamson

(57) ABSTRACT

Apparatuses, methods, and systems are disclosed for accessing a local data network via a mobile data connection. One apparatus (500) includes a processor (505) and a transceiver (525) that communicates with a mobile communication network. The processor (505) receives (605) a downlink data packet from a first data connection (303) over the mobile communication network, the first data connection (303) providing the apparatus (500) with access to a remote data network (125). The processor (505) determines (610), from the downlink data packet, whether the first data connection (303) provides access to a local data network (135) in addition to the remote data network (125). In response to the first data connection (303) providing access to the local data network (135), the processor (505) accesses (615) one or more services via the local data network (135).

18 Claims, 8 Drawing Sheets

(51) Int. Cl.
*H04W 48/04* (2009.01)
*H04W 48/14* (2009.01)
*H04W 48/18* (2009.01)
*H04W 88/06* (2009.01)
*H04L 12/813* (2013.01)

(52) U.S. Cl.
CPC ........... *H04W 48/18* (2013.01); *H04W 88/06* (2013.01); *H04L 47/20* (2013.01)

(56) References Cited

U.S. PATENT DOCUMENTS

| | | | |
|---|---|---|---|
| 10,694,404 B2 * | 6/2020 | Chandramouli | H04W 48/12 |
| 2011/0171953 A1 | 7/2011 | Faccin et al. | |
| 2012/0155313 A1 | 6/2012 | Hirano et al. | |

* cited by examiner

ACCESSING A LOCAL DATA NETWORK VIA A MOBILE DATA CONNECTION

FIELD

The subject matter disclosed herein relates generally to wireless communications and more particularly relates to accessing a local data network via a mobile data connection.

BACKGROUND

The following abbreviations are herewith defined, at least some of which are referred to within the following description.
  3GPP Third Generation Partnership Project
  5G Fifth Generation
  DHCP Dynamic Host Configuration Protocol
  DNS Domain Name System
  DL Downlink
  eNB Evolved Node B
  EPC Evolved Packet Core
  E-UTRAN Evolved Universal Terrestrial Radio Access
  IMS IP Multimedia Subsystem
  IP Internet Protocol
  LAN Local Area Network
  LTE Long Term Evolution
  PDU Packet Data Unit
  PLMN Public Land Mobile Network
  RAN Radio Access Network
  SMF Session Management Function
  SSDP Simple Service Discovery Protocol
  UE User Entity/Equipment (Mobile Terminal)
  UL Uplink
  UPF User Plane Function
  WiMAX Worldwide Interoperability for Microwave Access
  WLAN Wireless Local Area Network
  WPAD Web Proxy Auto-Discovery When a 5G UE moves into an area where local data services are available, the data connection of the UE may be re-configured by the 5G core network so that it supports access to these local data services, in addition to supporting access to remote data services. The local data services are services usually deployed in the vicinity of the UE, e.g. in a shopping mall, enterprise, etc, whereas remote data services are services usually deployed in the cloud and thus at far distance from the UE. A User Plane Function (UPF) accessing the local data network routes traffic either upstream towards the core network and then to the remote data service, or to the local data network. The forwarding decisions are normally taken by routing rules configured in the UPF. In doing so, the UPF provides a functionality referred to as an "Uplink Classifier (UL CL)" functionality.

One problem that arises when the data connection is re-configured to support access to a local data network, in addition to remote data networks, is that this re-configuration is completely transparent to the UE. In other words, the UE does not know when and if its data connection can provide access to local data services. If the UE is not aware of that, the UE may not attempt to discover such services unless (a) the user explicitly triggers the UE to start the service discovery (which leads to bad user experience) or (b) the UE is configured to periodically attempt the discovery (which leads to unnecessary use of battery and radio resources when the local data network is not available). This prevents the UE from optimizing its operation and from providing enhanced user experience.

BRIEF SUMMARY

Methods for accessing a local data network via a mobile data connection are disclosed. Apparatuses and systems also perform the functions of the methods. In one embodiment, a method for accessing a local data network via a mobile data connection includes receiving, at a remote unit, a downlink data packet from a first data connection over a mobile communication network, the first data connection providing access to a remote data network. The method includes determining from the downlink data packet whether the first data connection provides access to a local data network in addition to the remote data network. The method also includes accessing one or more services in the local data network in response to determining that the first data connection provides access to the local data network.

Another method for accessing a local data network via a mobile data connection includes establishing a first data connection with a remote unit over a first network interface. Here, the first data connection providing the remote unit access to a remote data network. The method includes communicating with a session management function ("SMF") over a second network interface and determining whether to configure the first data connection to provide access to a local data network in addition to the remote data network based on information received from the SMF. In response to determining to configure the first data connection to provide access to a local data network, the method includes activating a third network interface that communicates with a local data network. The method includes transmitting a downlink data packet to the remote unit over the first data connection, the downlink data packet including an indicator that the first data connection provides access to a local data network, in response to activating the third network interface, and providing the remote unit with access one or more services via the local data network using the third network interface.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
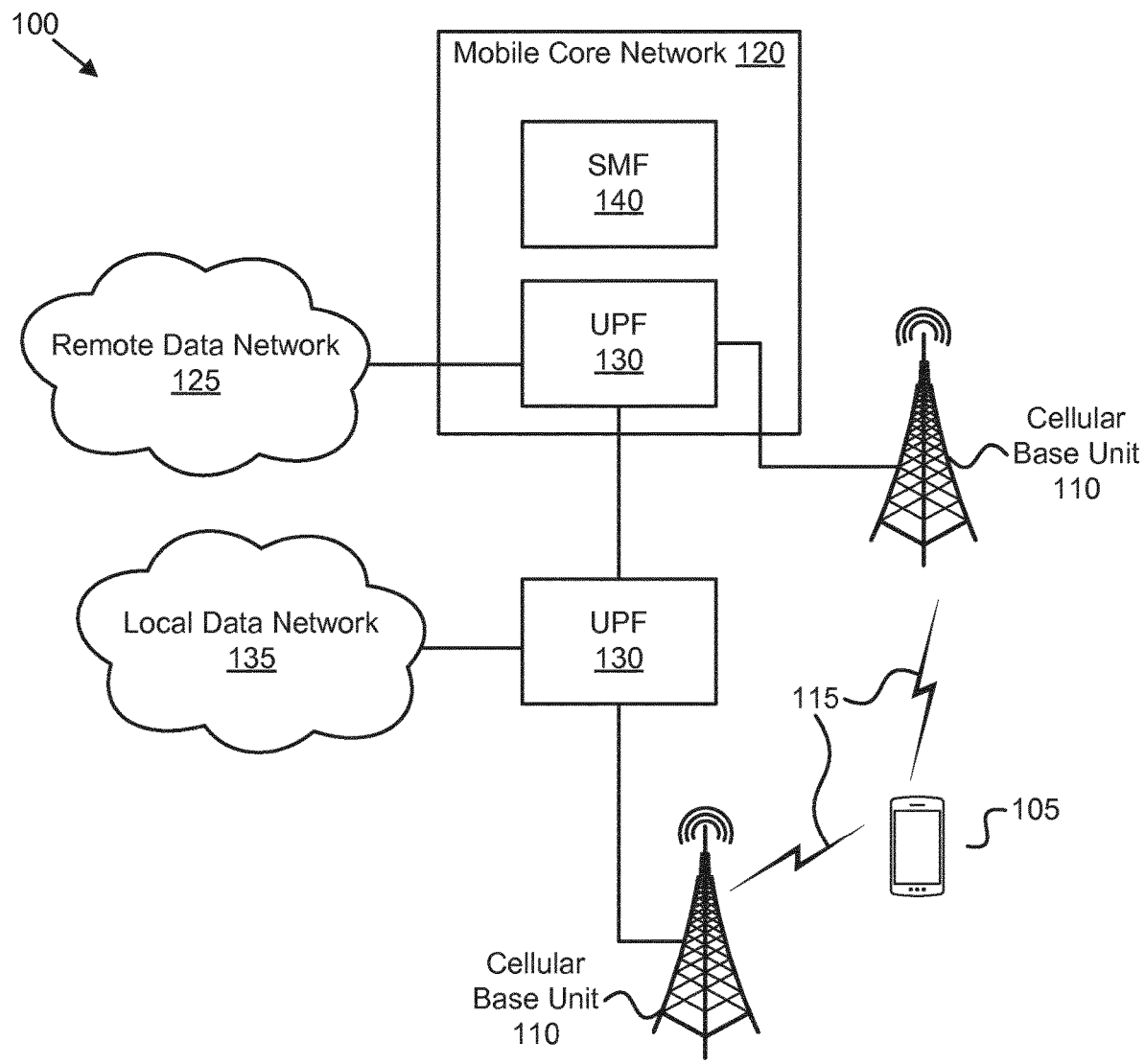
FIG. 1 is a schematic block diagram illustrating one embodiment of a wireless communication system for accessing a local data network via a mobile data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to solve the above described problem of discovering locally available data services and to efficiently route data requests for a local data network, a UE receives downlink packets having an indicator that indicates when an established data connection becomes capable to provide access to a local data network and, in response, enables access to the local data network via the said data connection. Here, the UE determines if a data connection over a mobile communication network can provide connectivity to a local data network, in addition to connectivity to a remote data network, by examining the indicator. In one embodiment, the indicator is a flag in the downlink packet header. In certain embodiments, the UE also determines a charging rate applied for the traffic to the local data network that is accessible via its data connection over the mobile communication network. Here, a downlink data packet may also include a local charging rate parameter.

In order to efficiently route data requests for a local data network, the UE marks the traffic sent to its data connection over the mobile data network to indicate which traffic should be routed to the local data network and which traffic should be routed to the remote data network. In certain embodiments, the UE configures a virtual network interface that provides access to the local data network via the first data connection. All data packets sent to this virtual network interface are transmitted via the first data connection but are also marked with a local access request flag. This local access request flag is interpreted by the mobile network as a request from UE to route the data packet to the local data network.

Note that this local access request flag is particularly useful for routing multicast/broadcast data packets because the destination address in these packets cannot indicate if they should be routed to the local data network or upstream to a remote data network. In addition, the local access request flag is useful when the address space of the local data network overlaps with the address space of the remote data network. In this case, routing cannot be solely based on the destination address. Moreover, the local access request flag is useful for routing unicast DNS queries to a DNS server in the local data network when the UE is not aware of the address of the DNS server in the local data network. In this case, the Uplink Classifier receiving the DNS query with the local access request flag changes the destination address in the DNS query and forwards it to the local data network to reach the DNS server in the local data network.

FIG. 1 a wireless communication system 100 for accessing a local data network via a mobile data connection, according to embodiments of the disclosure. In one embodiment, the wireless communication system 100 includes remote units 105, cellular base units 110, and cellular communication links 115. Even though a specific number of remote units 105, cellular base units 110, and cellular communication links 115 are depicted in FIG. 1, one of skill in the art will recognize that any number of remote units 105, cellular base units 110, and cellular communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the cellular base units 110 via uplink ("UL") and downlink ("DL") communication signals. Furthermore, the UL and DL communication signals may be carried over the cellular communication links 115.

In some embodiments, the remote units 105 communicate with a remote data network 125 via a data connection with the mobile core network 120. For example, a remote unit 105 may establish a data connection (also known as "PDU session") with the remote data network 125 via the mobile core network 120 and via a cellular base unit 110. A user plane function ("UPF") 130 in the mobile core network 120 then relays traffic between the remote unit 105 and the remote data network 125 over the data connection. As depicted, one or more UPFs 130 may be located outside the mobile core network 120. In certain embodiments, the UPFs 130 may have access to local data networks. When in the data path of a data connection of a remote unit 105, the UPF 130 may provide the remote unit 105 with access to local data services, such as print services, media/streaming services, HTTP services, file services, and the like.

The cellular base units 110 may be distributed over a geographic region. In certain embodiments, a cellular base unit 110 may also be referred to as an access terminal, a base, a base station, a Node-B, an eNB, a gNB, a Home Node-B, a relay node, a device, or by any other terminology used in the art. The cellular base units 110 are generally part of a radio access network ("RAN") that may include one or more controllers communicably coupled to one or more corresponding cellular base units 110. These and other elements of radio access network are not illustrated but are well known generally by those having ordinary skill in the art. The cellular base units 110 connect to the mobile core network 120 via the RAN.

The cellular base units 110 may serve a number of remote units 105 within a serving area, for example, a cell or a cell sector via a wireless communication link. The cellular base units 110 may communicate directly with one or more of the remote units 105 via communication signals. Generally, the cellular base units 110 transmit downlink ("DL") communication signals to serve the remote units 105 in the time, frequency, and/or spatial domain. Furthermore, the DL communication signals may be carried over the cellular communication links 115. The cellular communication links 115 may be any suitable carrier in licensed or unlicensed radio spectrum. The cellular communication links 115 facilitate communication between one or more of the remote units 105 and/or one or more of the cellular base units 110.

In one embodiment, the mobile core network 120 is a 5G core ("5GC") or the evolved packet core ("EPC"), which may be coupled to other networks, like the Internet and private data networks, among other packet data networks. Each mobile core network 120 belongs to a single public land mobile network ("PLMN"). The present disclosure is not intended to be limited to the implementation of any particular wireless communication system architecture or protocol.

As depicted, the mobile core network 120 includes a UPF 130 and a session management function ("SMF") 140. Although a specific number of UPFs 130 and SMFs 140 are depicted in FIG. 1, one of skill in the art will recognize that any number of UPFs 130 and SMFs 140 may be included in the mobile core network 120. The UPF 130 provides user plane (e.g., data) services to the remote units 105. A data connection between the remote unit 105 and a data network is managed by a UPF 130. The SMF 140 manages the data sessions of the remote units 105, such as the PDU session discussed above. In certain embodiments, the SMF 140 may add or modify the data path of a data connection used by a remote unit 105. For example, the SMF 140 may insert a new UPF 130 into the data path and/or configure a UPF 130 to provide access to the local data network 135.

As discussed in greater detail below, a UPF 130 may indicate availability of local data services (e.g., in the local data network 135) to a remote unit 105 already having a data connection to the remote data network 125. Here, the UPF 130 may flag one or more downlink packets to indicate the availability of local data services. An interested remote unit 105 may discover one or more local data services and flag uplink packets to be routed via the local data network 135. This flag in the uplink packet is interpreted by the mobile network (e.g., UPF 130) as a request from the remote unit 105 to route the data packet to the local data network 135.

Figure 2A:
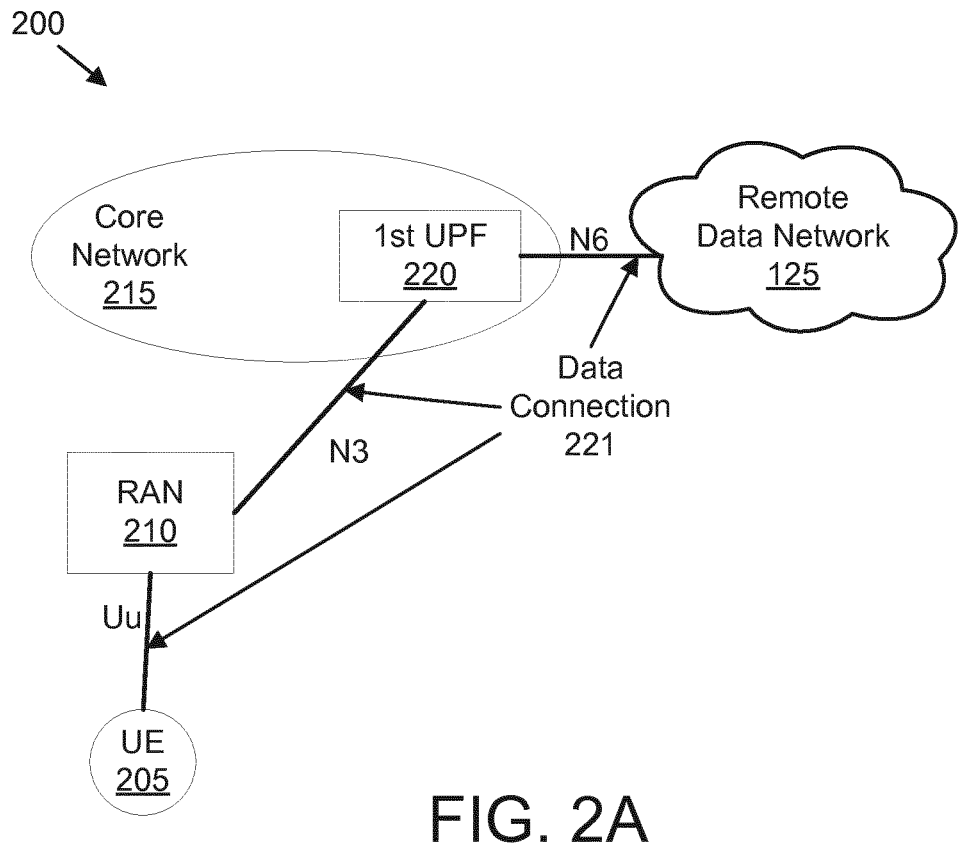
FIG. 2A illustrates one embodiment of a network architecture for accessing a local data network via a mobile data connection.
Figure 2B:
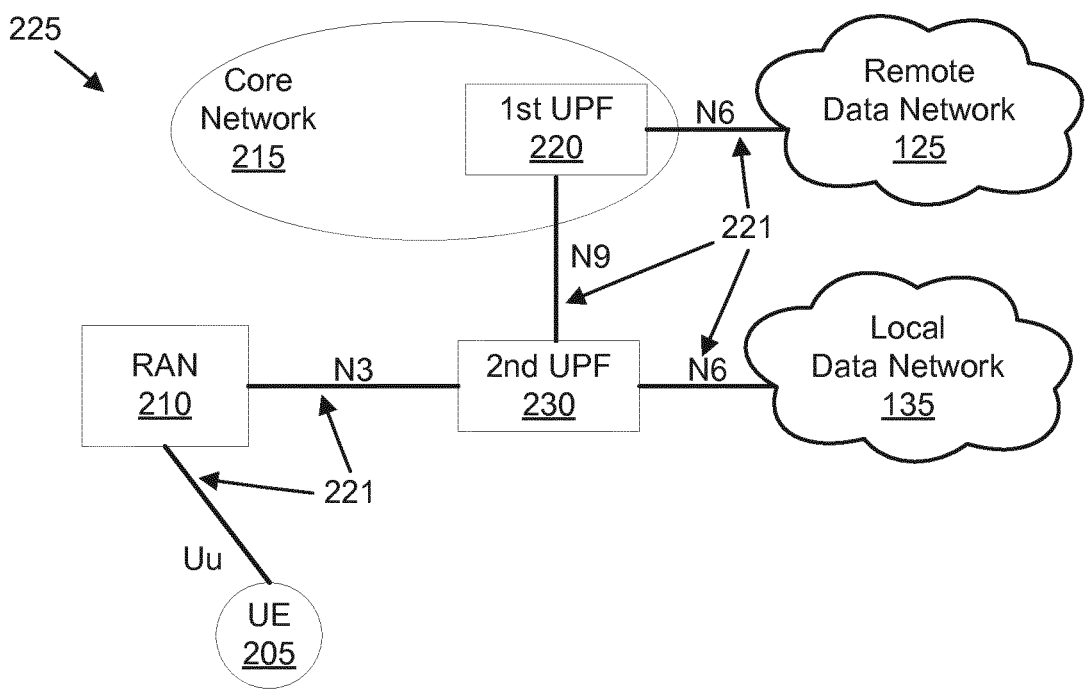
FIG. 2B illustrates another embodiment of a network architecture for accessing a local data network via a mobile data connection

FIG. 2A-2B depict network architectures used for accessing a local data network via a mobile data connection, according to embodiments of the disclosure. FIG. 2A depicts a network architecture 200 at a first moment in time. The network architecture 200 includes a UE 205, a RAN 210, a core network 215, a first UPF 220, and a remote data network 125. The UE 205 is a 5G UE and may be one embodiment of the remote unit 105 discussed above, the core network 215 is a 5G core network and may be one embodiment of the mobile core network 120 discussed above, and the first UPF 220 may be one embodiment of the UPF 130 discussed above. The remote data network may be substantially described above with reference to FIG. 1 and the RAN 210 may include a cellular base unit 110. In certain embodiments, the RAN 210 is a 3GPP RAN (e.g., E-UTRAN or 5G-RAN). In other embodiments, the RAN 201 may be a non-3GPP RAN (e.g., a Wi-Fi network).

FIG. 2A shows the UE 205 having established a data connection 221 which supports access to the remote data network 125 and to services available in the remote data network 125. In certain embodiments, the remote data network 125 is a private enterprise network while, in other embodiments, the remote data network 125 represents the entire Internet. In certain embodiments, the data connection 221 is a PDU session. The data path of the data connection 221 is composed of three concatenated interfaces: a radio interface (Uu) between the UE and RAN, a backhaul interface (N3) between RAN and the first UPF 220 in the 5G core network, and an N6 interface between the first UPF 220 and the remote data network 125. Although only one UPF is shown, in other embodiment multiple UPFs may be in the data path. For example, in roaming cases where the data path extends to the home network one UPF is required in the visited network and another UFP in the home network.

FIG. 2B depicts a network architecture 225 used for accessing a local data network via a mobile data connection. The network architecture 225 may be an embodiment of the network architecture 200 at another moment in time (e.g., at a future time after the UE 205 moves to a different location). Here, the network architecture 225 includes the elements of the network architecture 200 and further includes a second UPF 230 in the data path of the data connection 221. The second UPF 230 may be one embodiment of the UPF 130 discussed above. The first UPF 220 and the second UPF 230 communicate using an N9 interface.

When the UE 205 moves into an area (e.g. a mall, airport, enterprise, stadium, etc.) that supports local data services (e.g., print services, media services, HTTP services, Mobile Edge Computing ("MEC") services, etc.), the data path of the data connection 221 may be re-configured by the core network 215 (e.g., by a SMF in the core network 215) to support access to the local data network 135, as shown in FIG. 2B. For example, the SMF in the core network 215 may insert the second UPF 230 into the data path of the data connection 221. Here, the second UPF 230 supports access to a local data network 135 via a second instance of the N6 interface. Note that the main role of second UPF 230 is to receive data traffic from the UE 205 and to determine how to route this traffic. The second UPF 230 will either forward the traffic to an upstream UPF (e.g., the first UPF 220) for reaching the remote data network 125, or forward the traffic to the local data network 135.

After the second UPF 230 is inserted in the data path of the data connection 221, the second UPF 230 marks every downlink packet sent to the UE 205 with a "local access available" flag, a new flag indicating the availability of local services. For example, the local data network 135 may enable a user of the UE 205 to print documents to a local print server and/or to consume audio/video content from a local media server. When the UE 205 starts receiving packets via the data connection 221 that contain the local access available flag, the UE 205 determines that the data connection 221 provides access to a local data network 135 in addition to access the remote data network 125. In turn, the UE 205 may use the DHCP protocol to request IP configuration data (e.g. an IP address, network mask, domain name, DNS server address, etc.) for accessing the local data network. In addition, the UE 205 may discover the local services and enable access to the local data network 135 via the data connection 221.

Because certain UEs may not care about locally available services and because potentially hundreds of services may be available in the local data network 135, the local access available flag indicates that access to a local data network is available, but does not indicate which services are available to minimize packet overhead. This way, an interested UE can then discover the locally available services. As an example, the local access available flag (also referred to herein as a "local data available" flag) may be a one-bit flag in the header of the downlink packet.

The second UPF 230 adds the local access available flag to every X downlink packets. In certain embodiments, the value of X is 1 such that each downlink packet contains the local access available flag. In other embodiments, the value of X is greater than 1 such that not every packet includes the local access available flag. Here, the network operator may set the value for X (e.g., define how often to include the local access available flag).

In addition to the local access available flag, the second UPF 230 may mark one or more downlink packets sent to UE 205 with a "local charging rate" parameter indicating the charging rate applied to data traffic sent by the UE 205 and routed to the local data network 135 via the data connection 221. For example, this parameter may be two bits encoded as: '00' for free, '01' for 25% charging rate, '10' for 50% charging rate and '11' for 75% charging rate with respect to the charging rate applied to the traffic towards the remote data network 125 over the data connection 221. Note that the charging rate may be specific to the UE 205. In one embodiment, the second UPF 230 marks every downlink packet with the local charging rate parameter. In other embodiments, the second UPF 230 only marks some of the downlink packets with the local charging rate parameter to minimize packet overhead. Whenever the local charging rate changes, the second UPF 230 updates accordingly the charging rate parameter in the downlink packets.

In certain embodiments, the second UPF 230 indicates the availability of a local data network by including the local charging rate parameter in the downlink data packets. Here, the local access available flag may be omitted as the presence (or absence) of the local charging rate parameter indicates to the UE 205 also whether access to a local data network is available. Here, the second UPF 230 may add the local charging rate parameter to every X downlink packets whenever access the local data network 135 is available, where a network operator sets the value for X.

As one example, when the UE 205 is aware that it can access the local data network 135, the UE 205 behaves as it normally does when configuring a new network interface. That is, the UE 205 broadcasts (via the data connection 221) a dynamic host configuration protocol ("DHCP") request to discover a DHCP server in the local data network 135 and then requests from the DHCP server to provide IP configuration data, including an IP address, network mask, domain name, DNS server address, etc. After that the UE 205 is configured with two IP addresses on the same data connection 221: One IP address assigned when the data connection 221 was established and another IP address assigned with DHCP after receiving the local access available flag. Here, the first IP address is used for communication with the remote data network 125 and the latter IP address is used for communication with the local data network 135. Note that the above DHCP request broadcast by the UE 205 may include the local access request flag in order to be routed to the local data network 135.

As a second example, when the UE 205 is aware that it can access the local data network 135, the UE 205 may attempt to discover the locally offered services (e.g. printing service, media service, streaming services, etc.) and notify its applications and the user of the discovered services. As a third example, when the UE 205 is aware that it can access a local data network that supports data communication with reduced or no charging, the UE 205 may notify its applications which may then start content retrieval (e.g. start downloading a firmware update) which would be too costly over the remote data network 125. As a fourth example, when the UE 205 is aware that it can access a local data network, the UE 205 may use the Web Proxy Auto-Discovery ("WPAD") protocol to discover and use an HTTP proxy available in the local data network, thereby improving subsequent web browsing experience as requests for content locally cached in the HTTP proxy are able to be served very quickly.

In some embodiments, the UE 205 initiates service discovery by using the Simple Service Discovery Protocol ("SSDP") or the multicast DNS ("mDNS") protocols to discover some services available in the local data network. For example, the UE 205 may initiate discovery of print servers and/or media servers in the local data network by sending a SSDP search request or an mDNS query. In certain embodiments, the UE 205 initiates the WPAD protocol to discover and use an HTTP proxy in the local data network. After discovering an HTTP proxy in the local data network, the UE 205 may configure its networking layer to steer all HTTP traffic of the UE 205 to go through the HTTP proxy server in the local data network.

Having discovered one or more local data services, the UE 205 may indicate to the network (e.g., the second UPF 230) which uplink packets should be routed to the local data network. This is mainly required when the destination address of uplink packets cannot be used to determine if the packets should be routed to the local data network or to the remote data network, for example using Uplink Classifier, as discussed above. Here, the UE 205 marks uplink packets intended for the local data network 135 with a "local access request" flag, a new flag indicating packet routing to the UPF. The second UPF 230 routes packets marked with the local access request flag to the local data network 135, unless network policy in the second UPF 230 prevents such routing.

If the UE 205 receives IP configuration data from the local data network 135 (e.g., in response to a DHCP request), then the UE 205 becomes aware of the address space of the local data network 135. For example, the UE 205 may learn that all IP addresses in the local data network 135 are "192.168.x.y". Accordingly, the transmitted packets for the local data network 135 will have a destination address "192.168.x.y" and can be used by the second UPF 230 for routing without the need of the local access request flag. However, the local access request flag may still be used in case of multicast and/or broadcast traffic or in situations of overlapping address spaces of the remote data network 125 and the local data network 135.

In some embodiments, the UE 205 configures a new "virtual" network interface that provides access to the local data network 135 via the data connection 221. In one embodiment, all data packets sent to this virtual network interface are transmitted via the data connection 221 but are also marked with the local access request flag. Referring to the above examples, the UE 205 is to mark all service discovery requests (e.g. SSDP, mDNS requests) and all DHCP requests with the local access request flag to ensure routing to the local data network 135. In addition, the UE 205 may mark local service requests (e.g. print requests, streaming requests) with the local access request flag when these requests cannot be routed based on the destination address, e.g., when the address space of the remote and local data networks overlap.

In certain embodiments, the local access request flag (also referred to herein as a "local data request" flag) is a one-bit flag included in the packet header of each uplink packet. Here, a value of 1 may indicate that the uplink packet is to be routed to the local data network 135, while a value of 0 may indicate that the uplink packet is to be routed to the first UPF 220 and the remote data network 125. Note that each data packet exchanged over the Uu, N3 and N9 interfaces is prefixed by a specific header which contains metadata about the packet. In certain embodiments, the local access available flag, the local access request flag, and the local charging rate parameter may be included as additional metadata in this header.

Figure 3A:
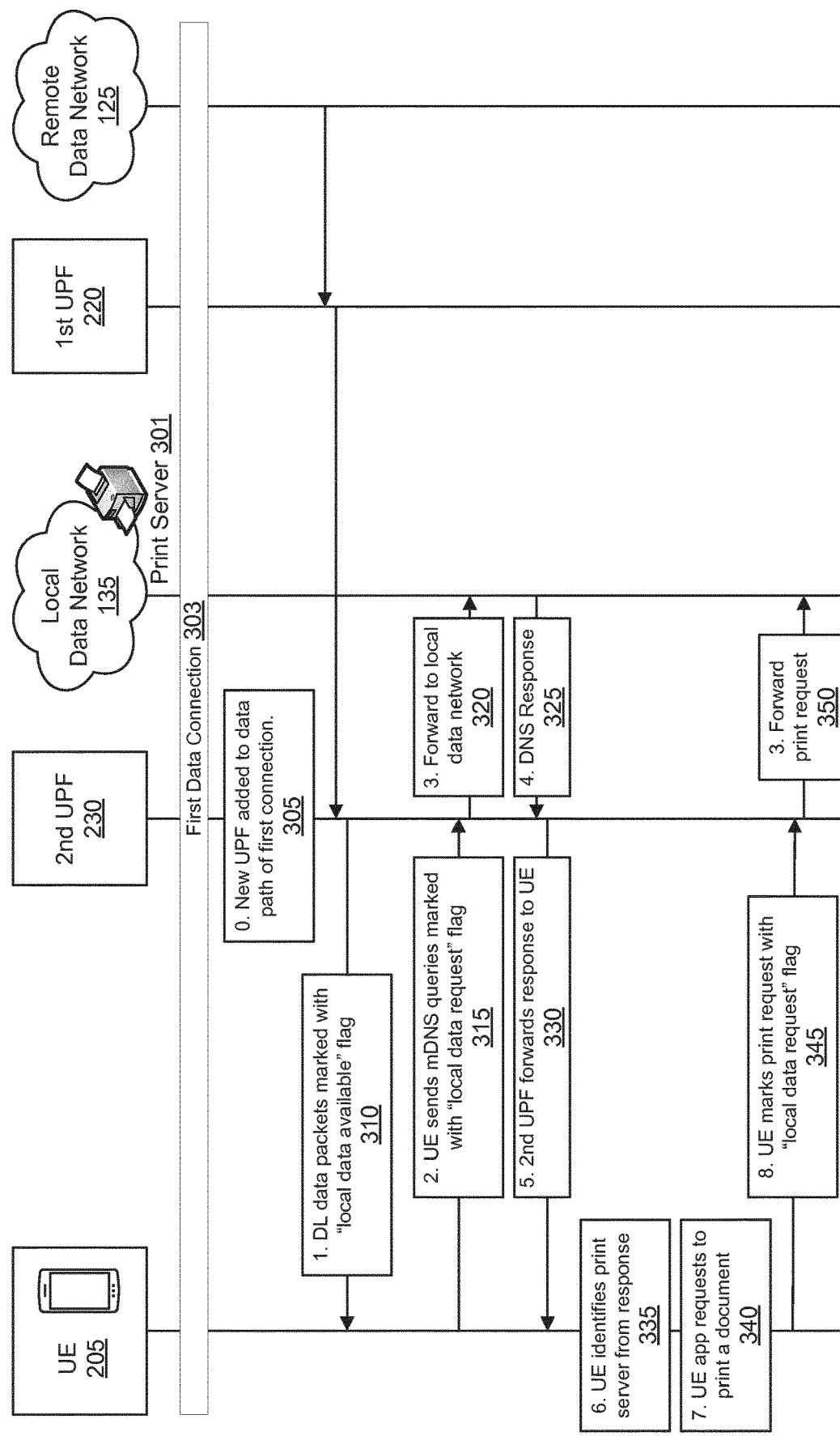
FIG. 3A illustrates one embodiment of a procedure for accessing a local data network via a mobile data connection.

FIG. 3A depicts a first procedure 300 for accessing a local data network via a mobile data connection, according to embodiments of the disclosure. The first procedure 300 involves the UE 205, first UPF 220, second UPF 230, remote data network 125, and the local data network 135. Here, the local data network 135 includes a print server 301 that provides local printing services. The first procedure 300 begins sometime after a first data connection 303 is established between the UE 205 and the remote data network 125 (e.g., over a mobile communication network). The first data connection 303 may be one embodiment of the data connection 221 discussed above. Initially, the path of the data connection passes through the first UPF 220 but does not pass through the second UPF 230.

At some point, the path of the first data connection 303 is modified (e.g., in response to the UE 205 moving to a new area) and a new UPF (e.g., the second UPF 230) is added to the data path (see block 305). Here, downlink traffic from the remote data network 125 first passes to the first UPF 220, then passes to the second UPF 230, and is finally passed to the UE 205 via the RAN (not shown in FIG. 3A). Because the UPFs are transparent to the UE 205, the UE 205 is unaware of the path modification to the first data connection 303.

Because the local data network 135 is accessible to the UE 205 via the second UPF 230, the second UPF 230 begins to mark the DL data packets with a "local data available" flag and transmits the marked DL data packets to the UE 205 (see block 310). For example, the second UPF 230 may set a flag bit in the packet headers of the downlink packets. The local data available flag indicates to the UE 205 that access to a local data network is available. However, the local data available flag does not indicate which services are available in the local data network. When the UE 205 is aware that it can access a local data network, the UE 205 may attempt to discover the local services and/or may attempt to request IP configuration data (e.g. via DHCP) for the local data network. For example, the UE 205 may be configured with a policy to utilize local services whenever available.

As depicted, the UE 205 discovers the available local services by sending out one or more mDNS query packets marked with a "local data request" flag (see block 315). Here, the mDNS query packets allow the UE 205 to discover which services are available via the local data network 135. The local data request flag indicates to the second UPF 230 that the mDNS query packets should be sent to the local data network 135, rather than to the first UPF 220 and remote data network 125.

Upon receiving the one or more mDNS query packets marked with a "local data request" flag, the second UPF 230 forwards the packets to the local data network 135 (see block 320). When forwarding uplink packets to the local data network 135, the second UPF 230 modifies the packet header (e.g., using network address and port translation ("NAPT")) to allow for routing in the local data network 135. Because the original source IP address may not be routable in the local data network 135, the second UPF 230 changes the source IP address to its own IP address and the source port number to its own source port. The second UPF 230 stores the IP address/port number mappings.

One or more devices in the local data network 135 may respond to the mDNS query (see block 325). Here, at least the print server 301 sends a DNS response to the mDNS query. While the query uses multicast DNS, the response may be a unicast DNS response. The second UPF 230 receives the DNS response(s) from the local data network 135 and forwards the response(s) to the UE 205 (see block 330). Here, the second UPF 230 again performs NAPT to modify the destination IP address and destination port number back to the original IP address/port number used by the UE 205.

Upon receiving the DNS response(s), the UE 205 determines services available via the local data network 135. Here, the UE 205 identifies at least the locally available print services provided by the local print server 301 from the DNS response (see block 335). Additionally, the UE 205 makes the discovered services (including print services of the discovered print server 301) available to its applications. When an application on the UE requests to print a document to the print server 301 (see block 340), the UE 205 transmits a sequence of packets (e.g., corresponding to a print job) to the IP address of the print server 301. These uplink packets are also marked with the local data request flag to ensure that the second UPF 230 routes the print job to the local data network 135. Note that if the packets addressed to the print server 301 are not also marked with the local data request flag, then the second UPF 230 may route these packets to the first UPF 220 and remote data network 125, especially when there is an overlap between the address space of the remote data network and the address space of the local access network.

Figure 3B:
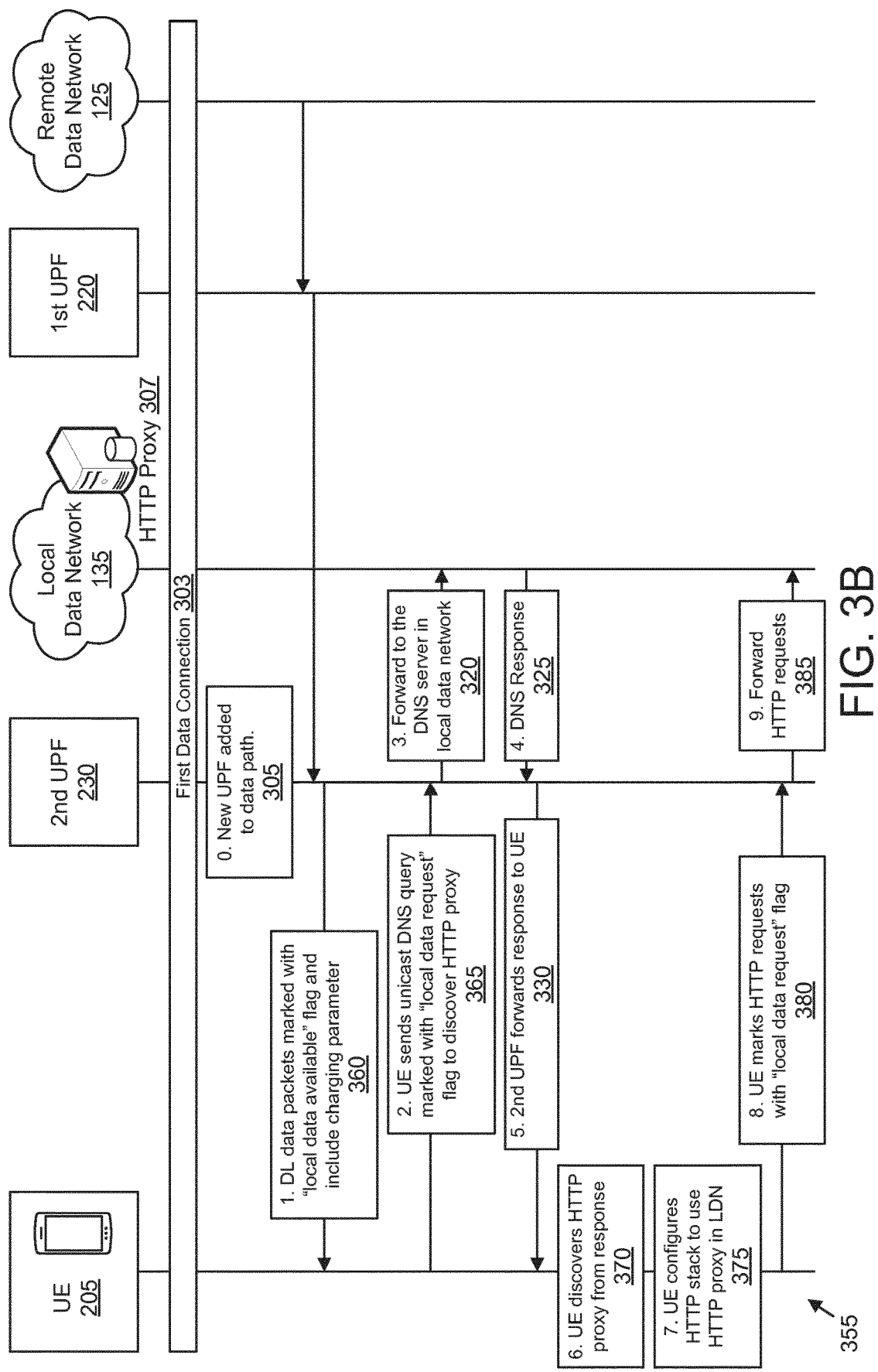
FIG. 3B illustrates another embodiment of a procedure for accessing a local data network via a mobile data connection.

FIG. 3B depicts a second procedure 355 for accessing a local data network via a mobile data connection, according to embodiments of the disclosure. The second procedure 355 involves the UE 205, first UPF 220, second UPF 230, remote data network 125, and the local data network 135. Here, the local data network 135 includes a HTTP proxy 307 that provides local HTTP proxy services. The second procedure 355 begins sometime after the first data connection 303 is established between the UE 205 and the remote data network 125 (e.g., over a mobile communication network). Initially, the path of the first data connection 303 passes through the first UPF 220, but does not pass through the second UPF 230.

At some point, the path of the first data connection 303 is modified (e.g., in response to the UE 205 moving to a new area) and a new UPF (e.g., the second UPF 230) is added to the data path (see block 305). Because the local data network 135 is accessible to the UE 205 via the second UPF 230, the second UPF 230 begins to mark the DL data packets with a "local data available" flag, indicating to the UE 205 that access to a local data network is available (see block 360). Additionally, the second UPF 230 includes a "local charging rate" parameter (see block 360). In certain embodiments, the second UPF 230 sends the local charging rate parameter in the first N number of DL packets. Here, N is a predetermined amount, for example ten, and may be configured by a network operator. In the embodiment of FIG. 3B, the local charging rate parameter indicates to the UE 205 that access to the local data network 135 is provided for free.

As depicted, the UE 205 discovers the available local services by sending out one or more unicast DNS query packets marked with a "local data request" flag (see block 365). The local data request flag indicates to the second UPF 230 that the DNS query packets should be sent to the local data network 135, rather than to the first UPF 220 and remote data network 125. Where UE 205 attempts to discover an HTTP proxy in the local data network 135, the UE 205 may send DNS query packets according to the WPAD protocol.

Upon receiving the one or more unicast DNS query packets marked with a "local data request" flag, the second UPF 230 forwards these packets to the local data network 135 (see block 320). When forwarding uplink packets to the local data network 135, the second UPF 230 modifies the packet header using NAPT. Here, the second UPF 230 may change the destination IP address to include the IP address of the DNS server (not shown in FIG. 3B) in the local data network 135, instead of the IP address of the DNS server in the remote data network. Additionally, the second UPF 230 changes the source IP address and the source port number so that the response is routed back to the second UPF 230.

The DNS server in the local data network 135 sends a DNS response to the second UPF 230 (see block 325). The second UPF 230 forwards the response to the UE 205 (see block 330). Here, the second UPF 230 again performs NAPT to modify the destination IP address and destination port number back to the original IP address/port number used by the UE 205 in its DNS request.

The UE 205 discovers the HTTP proxy 307 from the DNS response (see block 370). The DNS response from the local DNS server includes the URL of a WPAD file, the WPAD file including an auto-configuration script. The UE 205 retrieves this WPAD file by initiating an HTTP GET operation and configures its HTTP stack to use the discovered HTTP proxy 307 in the local data network 135 based on the contents of the WPAD file (see block 375).

The UE 205 sends subsequent HTTP requests to the discovered HTTP proxy 307 in the local data network 135. All these requests are marked with the "local data request" flag in order to make sure they are routed to the local data network 135 (see block 380). The performance of HTTP-based services may then be improved because requested content may be retrieved from the local cache of the HTTP proxy 307.

Figure 4:
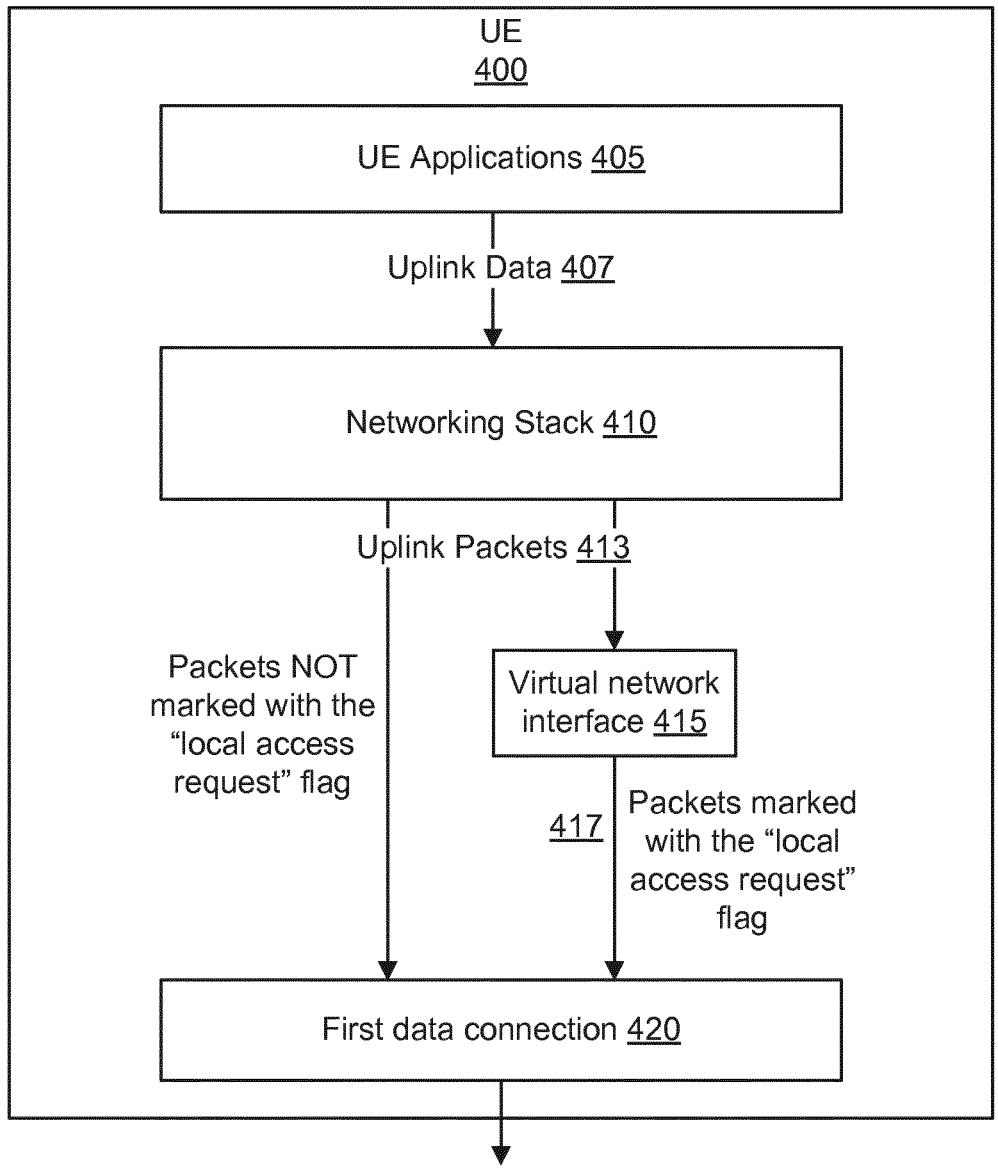
FIG. 4 is a diagram illustrating one embodiment of uplink packet flow for accessing a local data network via a mobile data connection.

FIG. 4 depicts a UE model for supporting data traffic to the remote data network and to the local data network via the same data connection. The UE 400 may be one embodiment of the remote unit 105 and/or UE 205 discussed above. The UE 400 includes one or more UE applications 405 installed thereon which generate uplink data 407. The UE applications pass the uplink data 407 to the networking stack 410 which generates uplink packets 413. Here, the uplink packets 413 include headers and payloads. The networking stack 410 determines a network interface for each uplink packet 413. Those uplink packets 413 that should reach the local data network 135 (e.g., because they are for services in the local data network) are sent to the virtual network interface 415. At the virtual network interface 415, each uplink packet is marked with a "local access request" flag (also referred to as a local data request) forming marked uplink packets 417. Those uplink packets 413 not destined for the local data network 135 are not marked. Both the marked and unmarked uplink packets 413 are then sent to the first data connection 420 for transmission over the mobile network (e.g., transmitted to the RAN). The first data connection 420 may be substantially similar to the data connection 221 and first data connection 303 discussed above. When the UE 400 uses the DHCP protocol as discussed above to receive IP data configuration for accessing the local data network, this IP data configuration is used to configure the virtual network interface 415. For example, the virtual interface 415 may be assigned the IP address received from the DHCP server in the local data network.

Figure 5A:
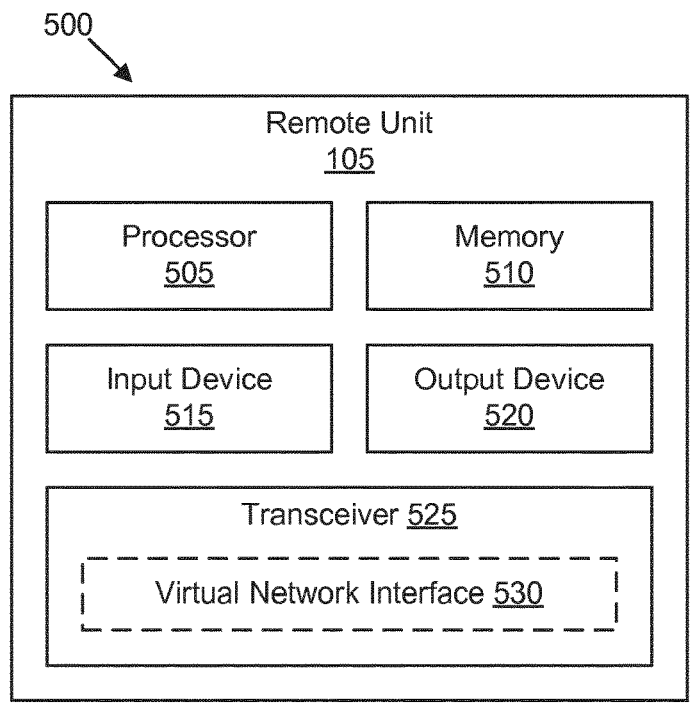
FIG. 5A is a schematic block diagram illustrating one embodiment of an apparatus for accessing a local data network via a mobile data connection.

FIG. 5A depicts one embodiment of an apparatus 500 that may be used for accessing a local data network via a mobile data connection, according to embodiments of the disclosure. The apparatus 500 includes one embodiment of the remote unit 105. Furthermore, the remote unit 105 may include a processor 505, a memory 510, an input device 515, a display 520, a transceiver 525 for communicating over an access network (e.g., a 3GPP RAN or a WLAN). In some embodiments, the input device 515 and the display 520 are combined into a single device, such as a touchscreen. In certain embodiments, the remote unit 105 may not include any input device 515 and/or display 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the processor 505 receives a downlink data packet from a first data connection (e.g., the data connection 221, the first data connection 303, and/or the first data connection 420) over the mobile communication network. Here, the first data connection provides the remote unit 105 with access to a remote data network 125. The processor 505 determines, from the downlink data packet, whether the first data connection provides access to a local data network 135 in addition to the remote data network 125. In response to the first data connection providing access to the local data network 135, the processor 505 accesses one or more services via the local data network 135.

In some embodiments, the processor 505 examines a flag in a header of the downlink data packet (e.g., a "local access availability" flag) to determine whether the first data connection provides access to a local data network 135. Here, the flag (e.g., local access availability flag) indicates whether the first data connection provides access to the local data network 135. For example, when set (e.g., to a binary "1"), the flag indicates that a local data network 135 is available to access via the first data connection. If the flag is not set, the processor 505 determines that no local data network 135 is available to access via the first data connection.

In certain embodiments, the downlink data packet further includes a charging rate parameter. For example, the charging rate parameter may be inserted into the packet header. The charging rate parameter indicates a charging rate applied to data traffic sent by the remote unit 105 to the local data network 135 via the first data connection. The charging rate may be specific to the remote unit 105. For example, devices of a certain model, manufacture, or associated with a certain subscription may be charged at a different rate than others. Upon parsing the charging rate parameter, the processor 505 may inform one or more applications installed at the remote unit 105 that a new network interface if available (e.g. the virtual network interface 415) which supports data communication free of charge or with a reduced charging rate. In one embodiment, the processor 505 informs the application(s) only if the charging rate applied to data traffic sent by the remote unit 105 to the local data network 135 via the first data connection is different than a default charging rate for data traffic sent by the remote unit 105 via the first data connection.

In some embodiments, the processor 505 determines whether a charging rate parameter is present in the downlink data packet (e.g., in a packet header of the downlink data packet) to determine whether the first data connection provides access to the local data network 135. Here, the presence of the charging rate parameter serves as an indication that the first data connection provides access to both the remote data network 125 and a local data network 135. In such embodiments, the processor 505 determines that no local data network 135 is available to access via the first data connection whenever the downlink data packet does not include a charging rate parameter.

In certain embodiments, the processor 505 accesses the one or more services via the local data network 135 by configuring a virtual network interface 530 for accessing the local data network 135 via the first data connection. The virtual network interface 530 may be one embodiment of the virtual network interface 415 discussed above. Configuration of the virtual network interface 530 may be performed by using the DHCP protocol, after receiving the local data available flag, to request and receive IP configuration data including an IP address, network mask, domain name, address of DNS servers, etc. In such embodiments, the processor 505 may mark each uplink packet sent to the virtual network interface 415 with a flag (e.g., a "local access request" flag). Here, the flag requests routing of the uplink packet to the local data network 135.

In some embodiments, the processor 505 accesses the one or more services via the local data network 135 by sending a service discovery request to the local data network 135. For example, the processor 505 may send a DNS query packet, including an mDNS query packet. As another example, the processor 505 may send a Simple Service Discovery Protocol ("SSDP") packet. The processor 505 flags the service discovery request (e.g., marks the request with a local access request flag), to request that the service discovery request (e.g., the DNS query or SSDP packet) be routed to the local data network 135.

In certain embodiments, accessing one or more services via the local data network 135 includes the processor 505 discovering a HTTP proxy 307 in the local data network 135. In such embodiments, the processor 505 sends HTTP traffic to the discovered HTTP proxy 307 in the local data network 135. In other embodiments, accessing one or more services via the local data network 135 includes the processor 505 requesting IP configuration data by using the DHCP protocol and using the received IP configuration data to configure a new network interface (e.g. the virtual network interface 530) that supports data communication with the local data network.

In some embodiments, the processor 505 receives an uplink packet (e.g., from an application installed on the remote unit 105) and determines whether the uplink packet is to be transmitted to the local data network 135. For example, the uplink packet may belong to a local service provided by the local data network 135. As another example, the uplink packet may not belong to a local service, but instead may simply need to be routed via the local data network 135 (e.g., to reduce cost).

If the processor 505 determines that the uplink packet should reach the local data network 135, then the processor 505 marks the uplink packet with a flag, such as a local access request flag. Here, the flag requests routing of the uplink packet to the local data network 135. After flagging the uplink packet, the processor 505 transmits it via the first data connection. Upon receiving the uplink packet and detecting the flag (e.g., the local access request flag), the UPF routes the flagged packet to the local data network 135.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to accessing a local data network via a mobile data connection. In some embodiments, the memory 510 also stores program code and related data, such as an operating system or other controller algorithms operating on the remote unit 105 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes two or more different devices, such as a keyboard and a touch panel. In certain embodiments, the input device 515 may include a camera for capturing images or otherwise inputting visual data.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The transceiver 525 communicates with a mobile communication network (e.g., a PLMN) over an access network, such as a 3GPP RAN or a WLAN. In some embodiments, the mobile communication network comprises the cellular base units 110 and a mobile core network 120 discussed above with reference to FIG. 1. The transceiver 525 may include hardware circuitry and/or software code for communicating with the access network. For example, the first transceiver may include one or more transmitters used to provide UL communication signals to the cellular base unit 110 and one or more receivers used to receive DL communication signals from the cellular base unit 110. The transceiver 525 supports the virtual network interface 530 used when sending uplink packets to the local data network 135.

Figure 5B:
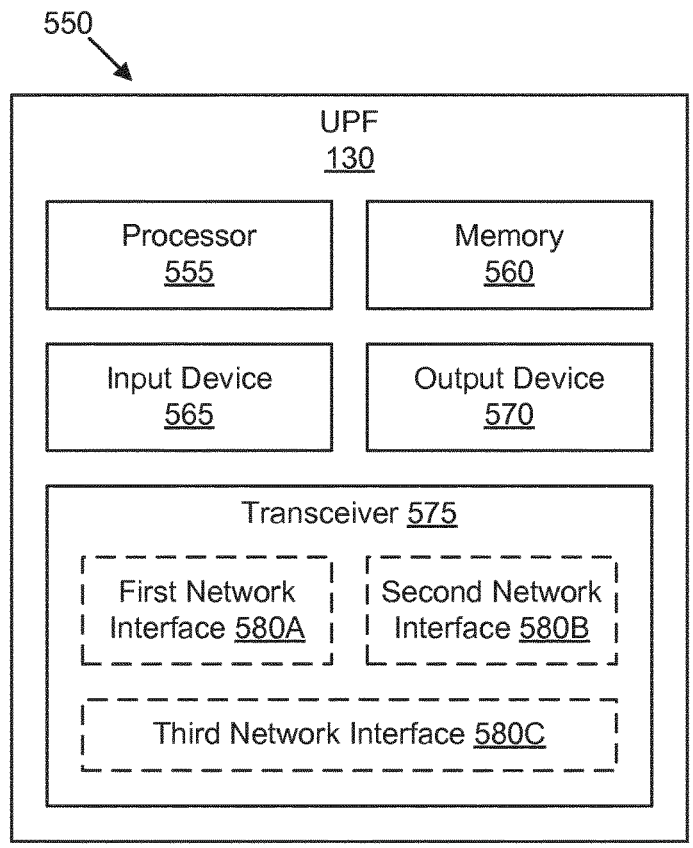
FIG. 5B is a schematic block diagram illustrating another embodiment of an apparatus for accessing a local data network via a mobile data connection.

FIG. 5B depicts an apparatus 550 that may be used for accessing a local data network via a mobile data connection. The apparatus 550 includes one embodiment of the UPF 130 in the data path of a first data connection (such as the data connection 221, first data connection 303, and/or first data connection 420). Furthermore, the UPF 130 may include a processor 555, a memory 560, and a transceiver 575 supporting one or more network interfaces 580. As may be appreciated, the processor 555 and memory 560 may be substantially similar to the processor 505 and the memory 510, respectively. In certain embodiments, the UPF 130 also includes an input device 565 and an output device 570, which may be substantially similar to the input device 515 and output device 520, described above. The processor 555 is communicatively coupled to the memory 560, input device 565, output device 570, and transceiver 575.

In some embodiments, the processor 555 provides a first network interface 580A that supports communication with the UE over the first data connection (e.g., the data connection 221, first data connection 303, and/or first data connection 420) and a second network interface 580B that supports communication with the SMF 140. The processor 555 determines whether to configure a first data connection (e.g., the data connection 221) to provide access to a local data network 135 in addition to the remote data network 125. Here, the first data connection provides a remote unit 105 access to a remote data network 125. The determination is based on information received from the SMF 140 via the second network interface 580B. In response to determining to configure the first data connection to provide access to a local data network, the processor 555 activates a third network interface 580C that communicates with a local data network 135.

In response to activating the third network interface 580C, the processor 555 transmits a downlink data packet to the remote unit 105 over the first data connection. Here, the downlink data packet includes an indicator that the first data connection provides access to a local data network. The processor 555 also provides the remote unit 105 with access to one or more services via the local data network 135 using the third network interface.

In some embodiments, the processor 555 indicates that the first data connection supports access to a local data network 135 by setting a local access availability flag in a header of the downlink data packet. In certain embodiments, the processor 555 inserts the local access availability flag into every X downlink data packets of the first data connection, in response to activating the third network interface. Here, X may be a value selected by a network operator.

In certain embodiments, the processor 555 further sets a charging rate parameter in the header. Here, the charging rate parameter indicates a charging rate applied to data packets sent by the remote unit 105 to the local data network 135. In one embodiment, in response to activating the third network interface, the processor 555 sends the charging rate parameter is only in a predetermined number of downlink packets. In another embodiment, in response to determining that the charging rate applied to data packets sent by the remote unit to the local data network has changed, the processor 555 sends the charging rate parameter in a predetermined number of downlink packets.

In some embodiments, the processor 555 indicates that the first data connection provides access to a local data network 135 by placing a charging rate parameter in a packet header of the downlink data packet. Here, the presence of the charging rate parameter indicating that the first data connection provides access to the local data network 135.

In certain embodiments, the processor 555 provides the remote unit 105 with access to one or more services via the local data network 135 by receiving an uplink packet over the first data connection, determining whether the uplink packet includes a local access request flag request, and routing the uplink packet via the third network interface in response to the uplink packet including the local access request flag request. In other embodiments, the processor 555 provides the remote unit 105 with access to one or more services via the local data network 135 by receiving an uplink packet over the first data connection and routing the uplink packet via the third network interface in response to the uplink packet including a destination IP address belonging to the address space of the local data network.

The transceiver 575 comprises communication hardware for communicating with elements of the mobile communication network, such as a core network 215, SMF 140, additional UPF 130, and a RAN, such as the RAN 210. The transceiver 575 supports the first network interface 580A used to facilitate communication between a remote unit 105 and the remote data network 125. Here, the first network interface 580A may communicate with the RAN using a N3 backhaul interface. The transceiver 575 also supports the second network interface 580B used to communicate with with an SMF 140. The transceiver 575 further supports the third network interface 580C used to facilitate communications between the remote unit 105 and the local data network 135.

The transceiver 575 also communicates with a packet data network, for example communicating with the remote data network 125 using the first network interface 580A or communicating with the local data network 135 using the third network interface 580C. Here, the first network interface 580A may use a N6 interface for communicating with the remote data network 125 and the third network interface 580C may also use a N6 interface for communicating with the local data network 135. When the UPF 130 supports an N6 interface with a packet data network, the UPF 130 is said to support an anchor functionality.

In certain embodiments, the transceiver 575 is also configured to communicate with one or more additional UPFs 130, for example using the first network interface 580A. Here, the first network interface 580A may use an N9 interface for communicating with a UPF 130. The transceiver 575 may also communicate with a SMF 140, for example using the second network interface 580B. In some embodiments, the processor 555 may control the first data connection to provide a remote unit 105 with access to a local data network 135 by activating the third network interface 580C, as described herein.

Figure 6:
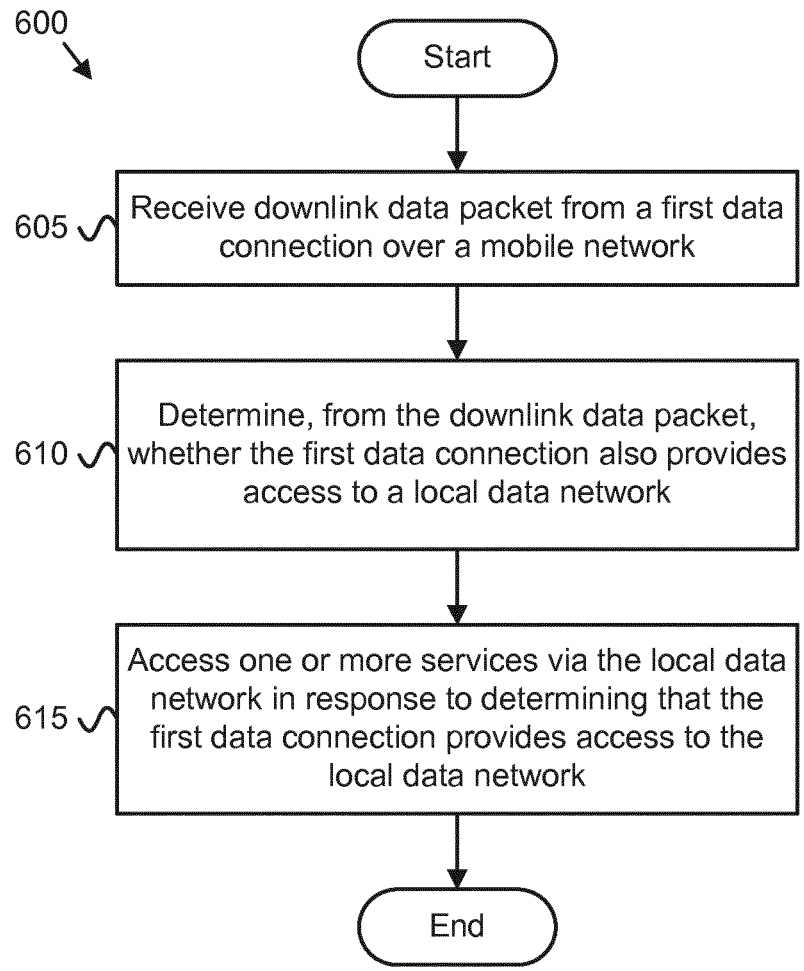
FIG. 6 is a schematic flow chart diagram illustrating one embodiment of a method for accessing a local data network via a mobile data connection.

FIG. 6 is a schematic flow chart diagram illustrating one embodiment of a method 600 for accessing a local data network via a mobile data connection, according to embodiments of the disclosure. In some embodiments, the method 600 is performed by an apparatus, such as the remote unit 105 or UE 205. In certain embodiments, the method 600 may be performed by a processor executing program code, for example, a microcontroller, a microprocessor, a CPU, a GPU, an auxiliary processing unit, a FPGA, or the like.

The method 600 may include receiving 605, at a remote unit, a downlink data packet from a first data connection over the mobile communication network. Here, the first data connection providing access to a remote data network. The first data connection may be the data connection 221, first data connection 303, and/or the first data connection 420 discussed above.

The method 600 includes determining 610 from the downlink data packet whether the first data connection provides access to a local data network in addition to the remote data network. In some embodiments, determining 610 from the downlink data packet whether the first data connection provides access to the local data network in addition to the remote data network includes determining whether a charging rate parameter is present in a packet header of the downlink data packet. Here, the presence of the charging rate parameter indicates that the first data connection provides access to the local data network.

In certain embodiments, determining 610 from the downlink data packet whether the first data connection provides access to the local data network in addition to the remote data network includes examining a local access availability flag in a header of the downlink data packet. In such embodiments, the local access availability flag indicating whether the first data connection provides access to the local data network. In further embodiments, the header may include a charging rate parameter in the header, the charging rate parameter indicating a charging rate applied to data traffic sent by the apparatus to the local data network via the first data connection. Here, the method 600 may additionally include the remote unit informing an application installed thereon of the charging rate applied to data traffic sent by the apparatus to the local data network.

The method 600 also includes accessing 615 one or more services in the local data network in response to determining that the first data connection provides access to the local data network. In one embodiment, accessing 615 one or more services in the local data network includes requesting and receiving IP configuration data (e.g. by using the DHCP protocol) and configuring with this data a virtual network interface that provides access to the local data network. In some embodiments, uplink packets sent via the virtual network interface are not marked with the local access request flag e.g. when the destination address in the uplink packet is considered enough for routing the packet to the local data network. In other embodiments, uplink packets sent via the virtual network interface are marked with the local access request flag e.g. when the destination address in the uplink packet is not enough for routing the packet to the local data network (for example in multicast/broadcast packets).

In one embodiment, accessing 615 one or more services in the local data network includes discovering a hypertext transport protocol ("HTTP") proxy in the local data network and sending HTTP traffic to the discovered HTTP proxy in the local data network. In another embodiment, accessing 615 one or more services in the local data network comprises sending a service discovery request to the local data network. In a further embodiment, the method 600 may include the remote unit sending the service discovery request comprises sending a DNS query packet or a SSDP packet marked with a local access request flag, wherein the local access request flag requests routing the DNS query or the SSDP packet to the local data network.

In certain embodiments, the method 600 further includes determining whether an uplink packet should reach the local data network. In response to determining that the uplink packet should reach the local data network, the method 600 includes marking the uplink packet with a local access request flag. The method 600 further includes transmitting the uplink packet via the first data connection, wherein the local access request flag requests routing the uplink packet to the local data network. The method 600 ends.

Figure 7:
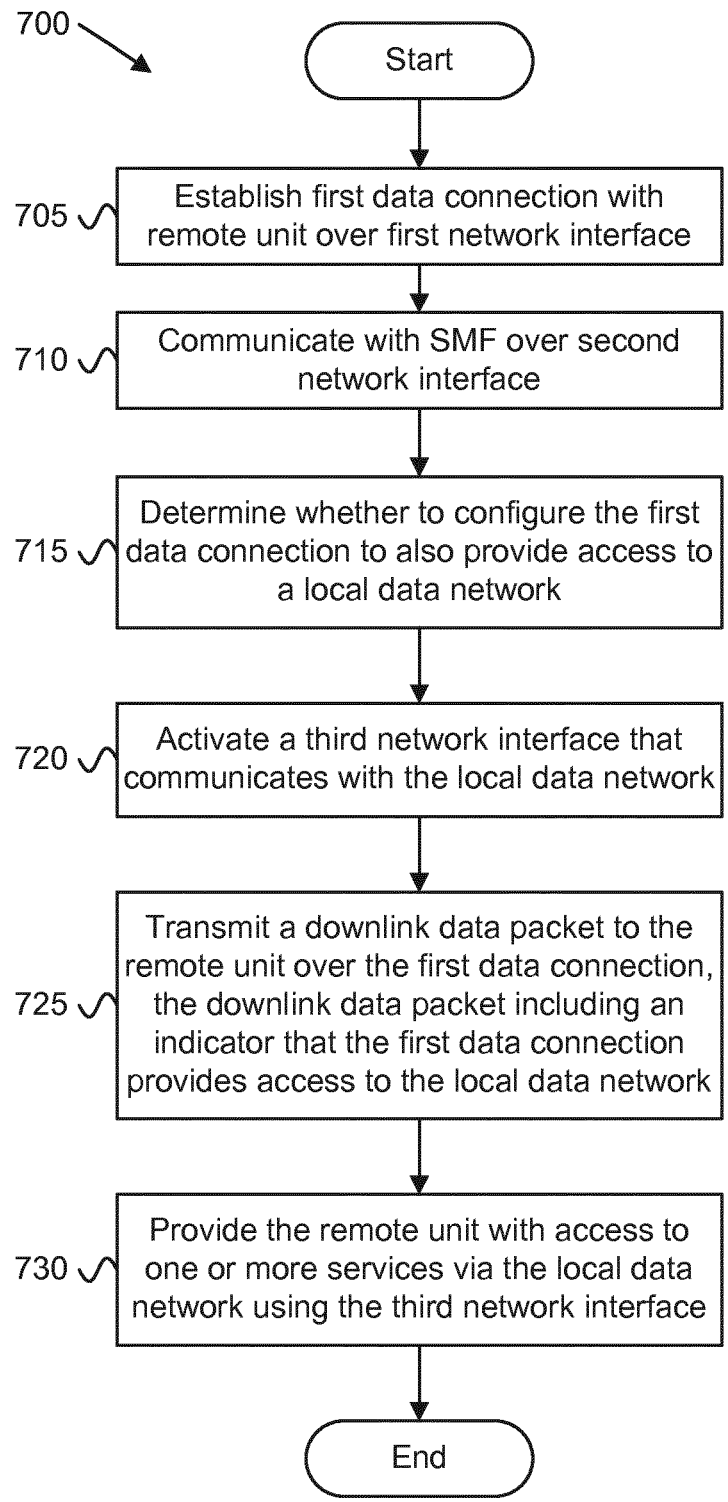
FIG. 7 is a schematic flow chart diagram illustrating another embodiment of a method for accessing a local data network via a mobile data connection.

FIG. 7 is a schematic flow chart diagram illustrating one embodiment of a method 700 for accessing a local data network via a mobile data connection, according to embodiments of the disclosure. In some embodiments, the method 700 is performed by an apparatus, such as the UPF 130 or second UPF 230. In certain embodiments, the method 700 may be performed by a processor executing program code, for example, a microcontroller, a microprocessor, a CPU, a GPU, an auxiliary processing unit, a FPGA, or the like.

The method 700 may include establishing 705 a first data connection with a remote unit over a first network interface. Here, the first data connection providing the remote unit access to a remote data network. The method includes communicating 710 with a session management function ("SMF") over a second network interface and determining 715 whether to configure the first data connection to provide access to a local data network in addition to the remote data network, based on information received from the SMF. In response to determining to configure the first data connection to provide access to a local data network, the method includes activating 720 a third network interface that communicates with a local data network.

The method includes transmitting 725 a downlink data packet to the remote unit over the first data connection, the downlink data packet including an indicator that the first data connection provides access to a local data network, in response to activating the third network interface. In some embodiments, transmitting 725 the downlink data packet including an indicator that the first data connection provides access to a local data network includes setting a local access availability flag in a header of the downlink data packet. In one embodiment, the method 700 further includes inserting the local access availability flag into every X downlink data packets of the first data connection, in response to activating the third network interface.

In certain embodiments, the method 700 also includes setting a charging rate parameter in the header, the charging rate parameter indicating a charging rate applied to data packets sent by the remote unit to the local data network. In one embodiment, in response to activating the third network interface, the charging rate parameter is only inserted in a predetermined number of downlink packets. In another embodiment, in response to determining that the charging rate applied to data packets sent by the remote unit to the local data network has changed, the charging rate parameter is only inserted in a predetermined number of downlink packets.

In some embodiments, transmitting 725 the downlink data packet including an indicator that the first data connection provides access to a local data network includes placing a charging rate parameter in a packet header of the downlink data packet. Here, the presence of the charging rate parameter indicating that the first data connection provides access to the local data network.

The method includes providing 730 the remote unit with access to one or more services via the local data network using the third network interface. In certain embodiments, providing 730 the remote unit with access to one or more services in the local data network includes determining whether an uplink packet received over the first data connection includes a local access request flag request and routing the uplink packet via the third network interface in response to the uplink packet including the local access request flag request. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a mobile communication network;
a processor that:
receives a downlink data packet from a first data connection over the mobile communication network, the first data connection providing the apparatus access to a remote data network, wherein a header of the downlink data packet contains a local access availability flag;
determines from the downlink data packet whether the first data connection provides access to a local data network in addition to the remote data network, wherein the local access availability flag indicates whether the first data connection provides access to the local data network; and
accesses one or more services in the local data network in response to determining that the first data connection provides access to the local data network.

2. The apparatus of claim 1, wherein the header further includes a charging rate parameter, the charging rate parameter indicating a charging rate applied to data traffic sent by the apparatus to the local data network via the first data connection.

3. The apparatus of claim 2, further comprising the processor informing an application installed at the apparatus of the charging rate applied to data traffic sent by the apparatus to the local data network.

4. The apparatus of claim 1, wherein accessing one or more services in the local data network comprises the processor requesting IP configuration data by using a dynamic host configuration protocol ("DHCP") request and configuring a virtual network interface for accessing the local data network via the first data connection with received IP configuration data.

5. The apparatus of claim 4, wherein the processor marks an uplink packet sent to the virtual network interface with a local access request flag, wherein the local access request flag requests routing the uplink packet to the local data network.

6. The apparatus of claim 1, wherein accessing one or more services in the local data network comprises the processor sending a service discovery request to the local data network.

7. The apparatus of claim 6, wherein sending the service discovery request comprises the processor sending a domain name system ("DNS") query packet or a Simple Service Discovery Protocol ("SSDP") packet marked with a local access request flag, wherein the local access request flag requests routing the DNS query packet or the SSDP packet to the local data network.

8. The apparatus of claim 1, wherein accessing one or more services in the local data network comprises the processor:
discovering a hypertext transport protocol ("HTTP") proxy in the local data network; and
sending HTTP traffic to the discovered HTTP proxy in the local data network.

9. The apparatus of claim 1, further comprising the processor:
determining whether an uplink packet is to be transmitted to the local data network;
marking the uplink packet with a local access request flag, in response to determining that the uplink packet is to be transmitted to the local data network; and
transmitting the uplink packet via the first data connection, wherein the local access request flag requests routing the uplink packet to the local data network.

10. A method comprising:
receiving, at a remote unit, a downlink data packet from a first data connection over a mobile communication network, the first data connection providing access to a remote data network, wherein a header of the downlink data packet contains a local access availability flag;
determining from the downlink data packet whether the first data connection provides access to a local data network in addition to the remote data network, wherein the local access availability flag indicates whether the first data connection provides access to the local data network; and
accessing one or more services in the local data network in response to determining that the first data connection provides access to the local data network.

11. The method of claim 10, wherein accessing one or more services in the local data network comprises discovering a hypertext transport protocol ("HTTP") proxy in the local data network and sending HTTP traffic to the discovered HTTP proxy in the local data network.

12. The method of claim 10, wherein the header further includes a charging rate parameter in the header, the charging rate parameter indicating a charging rate applied to data traffic sent by a remote unit to the local data network via the first data connection.

13. The method of claim 12, further comprising the remote unit informing an application installed thereon of the charging rate applied to data traffic sent by a remote unit to the local data network.

14. The method of claim 10, further comprising:
determining whether an uplink packet is to be transmitted to the local data network;
marking the uplink packet with a local access request flag, in response to determining that the uplink packet is to be transmitted to the local data network; and
transmitting the uplink packet via the first data connection, wherein the local access request flag requests routing the uplink packet to the local data network.

15. The method of claim 10, wherein accessing one or more services in the local data network comprises requesting IP configuration data by using a dynamic host configuration protocol ("DHCP") request and configuring a virtual network interface for accessing the local data network via the first data connection with received IP configuration data.

16. The method of claim 15, wherein an uplink packet sent to the virtual network interface is marked with a local access request flag, wherein the local access request flag requests routing the uplink packet to the local data network.

17. The method of claim 10, wherein accessing one or more services in the local data network comprises sending a service discovery request to the local data network.

18. The method of claim 17, wherein sending the service discovery request comprises sending a domain name system ("DNS") query packet or a Simple Service Discovery Protocol ("SSDP") packet marked with a local access request flag, wherein the local access request flag requests routing the DNS query packet or the SSDP packet to the local data network.

* * * * *